(12) United States Patent
Hsu et al.

(10) Patent No.: US 8,650,312 B2
(45) Date of Patent: Feb. 11, 2014

(54) CONNECTION ESTABLISHING MANAGEMENT METHODS FOR USE IN A NETWORK SYSTEM AND NETWORK SYSTEMS USING THE SAME

(75) Inventors: Hsueh-Cheng Hsu, Tao Yuan Shien (TW); Tsai-Mu Chen, Tao Yuan Shien (TW); Chun-Yu Lin, Tao Yuan Shien (TW)

(73) Assignee: Quanta Computer Inc., Kuei Shan Hsiang, Tao Yuan Shien (TW)

( * ) Notice: Subject to any disclaimer, the term of this patent is extended or adjusted under 35 U.S.C. 154(b) by 118 days.

(21) Appl. No.: 13/535,265

(22) Filed: Jun. 27, 2012

(65) Prior Publication Data

US 2013/0117461 A1    May 9, 2013

(30) Foreign Application Priority Data

Nov. 9, 2011   (TW) .............................. 100140854 A

(51) Int. Cl.
*G06F 15/16*      (2006.01)
(52) U.S. Cl.
USPC .......................................... 709/228; 709/227
(58) Field of Classification Search
USPC .................................. 709/200–203, 217–228
See application file for complete search history.

(56) References Cited

U.S. PATENT DOCUMENTS

| | | | |
|---|---|---|---|
| 7,228,330 B2 * | 6/2007 | Vignaud ....................... 709/203 |
| 7,895,356 B2 * | 2/2011 | Shiina ........................... 709/238 |
| 8,233,437 B2 * | 7/2012 | Tazaki ........................... 370/328 |
| 2003/0172112 A1 * | 9/2003 | Vignaud ....................... 709/203 |
| 2004/0172470 A1 * | 9/2004 | Shiina ........................... 709/224 |
| 2007/0115943 A1 * | 5/2007 | Perez Hernandez et al. . 370/352 |
| 2010/0002634 A1 * | 1/2010 | Tazaki ........................... 370/328 |

\* cited by examiner

*Primary Examiner* — Moustafa M Meky
(74) *Attorney, Agent, or Firm* — McClure, Qualey & Rodack, LLP

(57) ABSTRACT

Connection establishing management methods for traversing network address translation (NAT) routers and firewalls between network terminal devices to establish a connection channel therebetween for use in a network system including at least first, second and third network terminal devices and a traversal server are disclosed. First, when traversal server receives a call request of first and second network terminal devices, network topology levels of first and second network terminal devices are detected to detect whether first and second network terminal devices are located behind NAT router and/or firewall. Then, one of first and second network terminal devices or third network terminal device is selected according to the detection result such that selected network terminal device acted as proxy server for the traversal server to establish a connection channel corresponding to call request between first and second network terminal devices.

9 Claims, 2 Drawing Sheets

CONNECTION ESTABLISHING MANAGEMENT METHODS FOR USE IN A NETWORK SYSTEM AND NETWORK SYSTEMS USING THE SAME

CROSS REFERENCE TO RELATED APPLICATIONS

This Application claims priority of Taiwan Patent Application No. 100140854, filed on Nov. 9, 2011, the entirety of which is incorporated by reference herein.

BACKGROUND OF THE INVENTION

1. Field of the Invention

The invention relates to connection establishing management methods of network systems, and more particularly, to connection establishing management methods for traversing network address translation (NAT) routers and firewalls between network terminal devices to establish a connection channel therebetween.

2. Description of the Related Art

Recently, due to the vigorous development and popularity of network applications, bandwidth increase and progress of voice compression technology of network, and rapid development of Voice over IP (VoIP) technology, Internet users can transmit real-time voice and images and other multimedia information. When using VoIP, both ends of the receiver and the speaker must be filled in with the respective computer's IP address to enable the connection between the two parties. However, the real network may have various types of Firewalls and network address translators (hereinafter referred to as NAT). When the network terminal device is located behind the Firewall or NAT, e.g., for the user who uses dial-up or ADSL equipment to access Internet at home or is located behind the Firewall, direct normal communication between network terminal devices is impossible because of the difficulty of finding the external IP address, causing great inconvenience to the user.

In order to solve these problems, the VoIP traverse network address translation router (hereinafter referred to as NAT router) and Firewall-related technologies were then extensively studied. Through VoIP traverses NAT and Firewall technologies, VoIP can still run smoothly even if the user is behind a NAT router and/or Firewall. NAT is a kind of technology that inter-converts the internal IP address and external IP address. The NAT aims to provide function to visit the external network to the computer that was using the intranet IP address, through a few sets of computers that have the public IP address of the public network. The NAT converts the IP address of the IP datagram source that was issued to the external network by the computers of some intranet IP addresses into the IP address of the NAT's own public network. The destination IP address remains unchanged, and the IP datagram is transferred to the router and finally to the external computer. At the same time, the NAT converts the destination IP address of the external computer's returned IP datagram to the intranet IP address, while the source IP address remains unchanged, and is eventually sent to the computer of the internal network. Among them, the best-known and most commonly used VoIP traverses NAT router and Firewall solution was called Simple Traversal of UDP (User datagram protocol) through NAT (referred to as STUN) or Traversal Using Relay NAT (referred to as TURN). STUN uses the server located on the Internet to help network terminal device in the Firewall to obtain their external address transformed by the NAT and to assist VoIP call of other users to traverse through the Firewall to send to the network terminal device in the firewall. Through the STUN server, the client terminal device can determine the public address, the type of NAT blocked in front, and the connection port to connect with a particular local port through the NAT. This information will be used to establish a UDP communication between the client terminal device and the VoIP service providers to achieve the VoIP call.

The STUN server may help the network terminal device within the Firewall see the external address that has been converted. The network terminal device within the Firewall may send a message to the STUN server, and the STUN server may retrieve the external address of this network terminal device from the packet and send back this information to the network terminal device. In addition, the STUN server may also obtain the type of NAT through a series of test packets and provide responsive traversing method. The STUN, however, cannot traverse the symmetric NAT. TURN provides more powerful intermediary function than STUN, sufficient to traverse the symmetric NAT Firewall. The packets sent by the two endpoints of a VoIP session are all first sent to the TURN server and then forwarded to each other by the TURN server. When the TURN server receives a packet, the TURN server will store the IP address and port of the packet source and then forward the request of the proposed address to the other party. The TURN server then acts as a forwarder between the two addresses. Any information received from the first address may be provided to the second address, and any information received from the second address may be provided to the first. Although the aforementioned use of STUN/TURN technology may traverse through the Firewall, the load is concentrated in the STUN/TURN server and the STUN/TURN server is usually set in the remote end and is required to bear a lot of bandwidth. The routing path through the server is usually longer, causing the delay of transmission, packet loss, and failure in a timely process.

It is therefore a desire to provide connection establishing management methods for establishing a connection channel among the network terminal devices that are located behind the NAT router and firewall to solve the aforementioned problems.

BRIEF SUMMARY OF THE INVENTION

Connection establishing management methods for traversing network address translation (NAT) routers and firewalls between network terminal devices to establish a connection channel therebetween for use in a network system and network systems using the same are provided.

An embodiment of a connection establishing management methods for traversing network address translation (NAT) routers and firewalls between network terminal devices to establish a connection channel therebetween for use in a network system is provided. The network system includes at least first, second and third network terminal devices and a traversal server, wherein the first and second network terminal devices can traverse at least one NAT router and/or firewall to establish a connection channel between each other for data access through the traversal server. First, when the traversal server receives a call request of the first and second network terminal devices, network topology levels of the first and second network terminal devices are detected to detect whether the first and second network terminal devices are located behind the NAT router and/or firewall. Then, one of the first and second network terminal devices or the third network terminal device is selected according to the detection result such that the selected network terminal device acted as the proxy server for the traversal server to establish a connection channel corresponding to the call request between the first and second network terminal devices so as to access data therebetween.

An embodiment of a network system is also provided. The network system comprises at least first, second and third network terminal devices and a traversal server. The first and second network terminal devices can traverse at least one NAT router and/or firewall to establish a connection channel between each other for data access through the traversal server. Wherein, the traversal detects a network topology level of the first and second network terminal devices to detect whether the first and second network terminal devices are located behind the NAT router and/or firewall upon reception of a call request of the first and second network terminal devices, and selects one of the first and second network terminal devices or the third network terminal device according to the detection result for the first and second network terminal devices such that the selected network terminal device acted as a proxy server to substitute for the traversal server to establish a connection channel corresponding to the call request between the first and second network terminal devices so as to access data via the established connection channel.

Connection establishing management methods for use in a network system may take the form of a program code embodied in a tangible media. When the program code is loaded into and executed by a machine, the machine becomes an apparatus for practicing the disclosed method.

BRIEF DESCRIPTION OF THE DRAWINGS

The invention can be more fully understood by reading the subsequent detailed description and examples with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
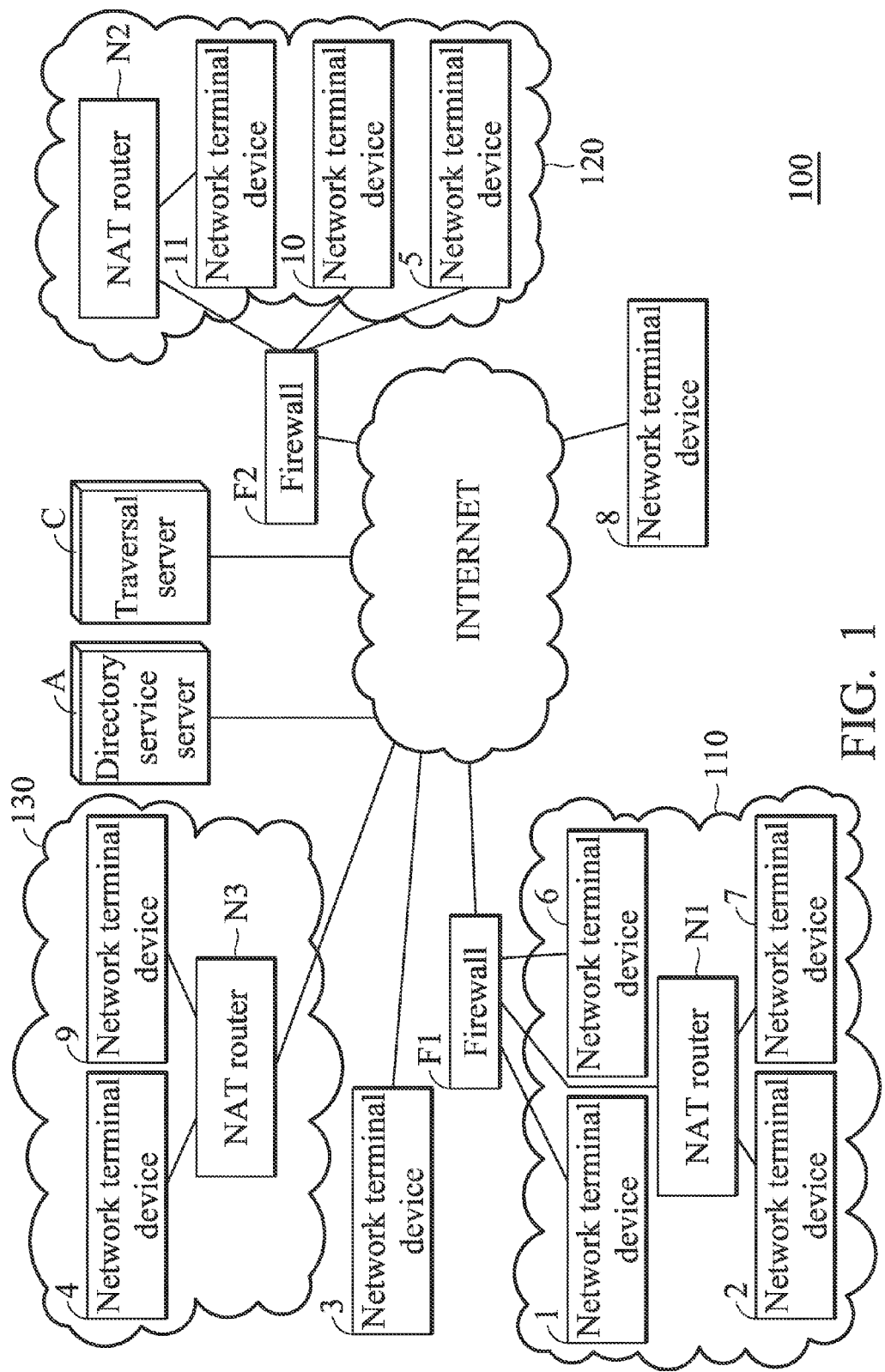
FIG. 1 shows a block diagram of an embodiment of a network system according to the invention.

FIG. 1 shows a block diagram of an embodiment of a network system 100 according to the invention. The network system 100 at least comprises first, second and third network terminal devices 1-11, a directory service server A and a traversal server C and the first and second network terminal devices may through the traversal server C to traverse at least one NAT router and/or firewall to establish a connection channel between each other for accessing data between the first and second network terminal devices. The first, the second or the third network terminal device may be any of the network terminal devices 1-11. For example, the first, second and third network terminal devices may be the network terminal devices 1, 2 and 3, respectively. To be more specific, the traversal server C can be referred to as a NAT/firewall traversal server and can be a STUN/TURN server or a HTTP tunneling server such that a network terminal device that is located within/behind an NAT router and/or a firewall may establish a connection channel with another network terminal device that is located within or out of an NAT router and/or a firewall for data access between each other through the traversal server C. With the STUN server, the network terminal device of the user may find information regarding its public network address such as the Internet address, the type of the NAT that it is currently located and so on and then establishes an UDP communication to accomplish a network communication link using these information. With the HTTP tunneling server, the network terminal device of the user within the firewall may pack the UDP packet into a HTTP packet using the HTTP tunneling and then traverse the firewall by sending this packet to the network terminal device of another user that is located outside the firewall to establish connection therebetween via the common HTTP/HTTPS port 80/443. For example, when the first network terminal device and the second network terminal device is connected to the Internet through a NAT router N1, the traversal server C is a STUN/TURN server and the first and second network terminal devices may traverse through the NAT router N1 via the STUN/TURN server to establish a connection channel between each other. In another example, when the first and second network terminal devices are connected to the Internet through a firewall F1, the traversal server C is a HTTP tunneling server and the first and second network terminal devices may traverse through the firewall F1 using the HTTP tunneling via the HTTP tunneling server to establish a connection channel between each other.

The directory service server A is a public server located on the Internet and it may provide directory service which records a mapping table of user names/code numbers and responsive IP address and connection com port information for all registered network terminal devices in the network system 100. For example, when the user "Jason" attempts to call the other user "John" to make a VoIP call, the IP address and connection port information of the "Jason" and "John" may first be acquired from the directory service server A by table lookup and then the traversal server C may arrange a routing path for connection using the information acquired from the directory service server A, e.g. information regarding the IP address and connection port, packet data format and so on. The traversal server C may detect a network topology level of each NTD, e.g. whether it is located within/behind a NAT router or a firewall, whether it is located in a same private network or a same public network and the number of the NATs and/or firewalls for which it is located behind and other network environment conditions, and then find a shortest path between two network terminal devices which are being protected accordingly. The connection establishing management methods for use in a network system are detailed in the following.

Figure 2:
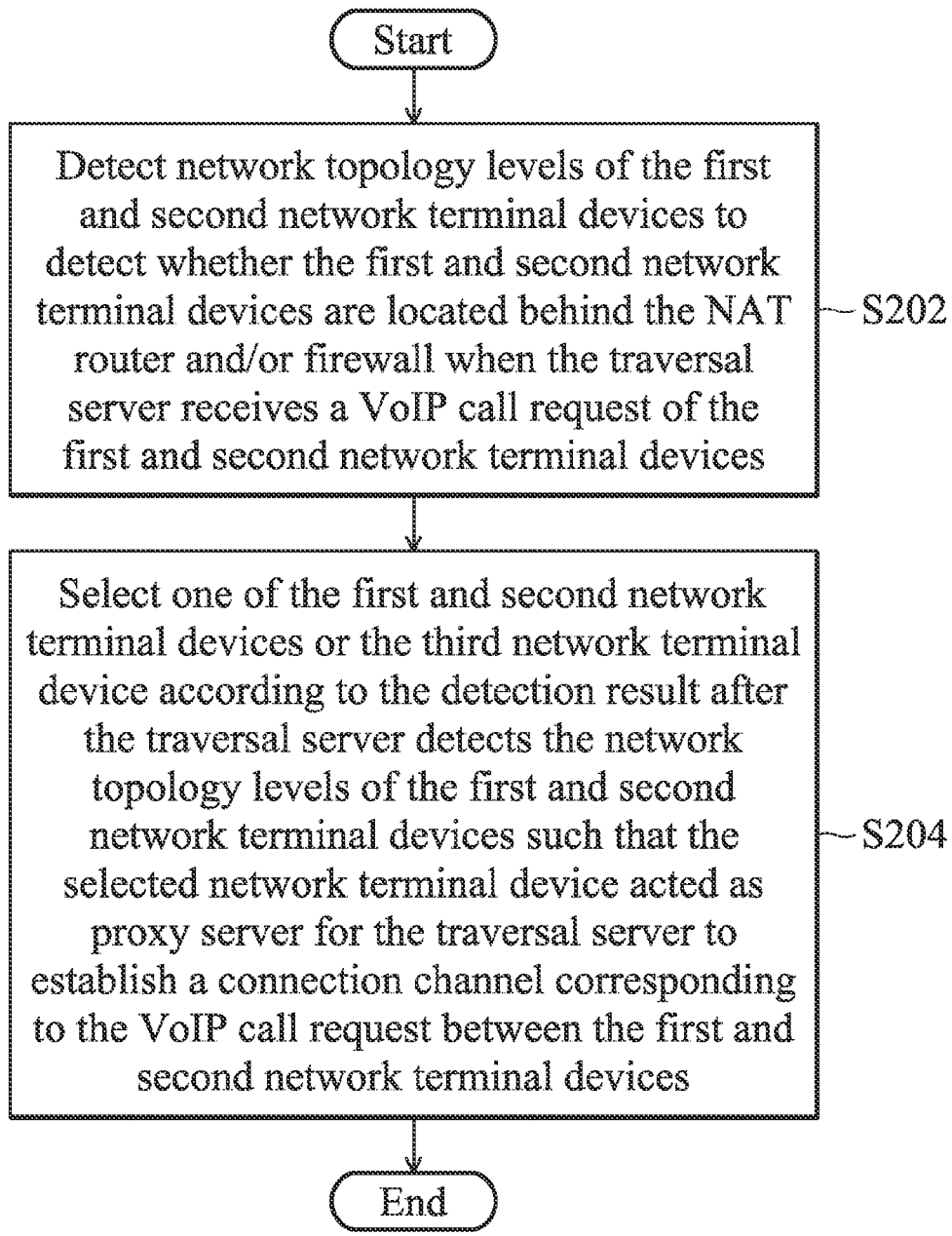
FIG. 2 is a flowchart illustrating an embodiment of a connection establishing management method for use in a network system according to the invention.

FIG. 2 is a flowchart illustrating an embodiment of a connection establishing management method for use in a network system according to the invention for traversing through the NAT router and the firewall to establish connection channels among network terminal devices. Please refer to both FIGS. 1 and 2. In this embodiment, it is assumed that the network system 100 comprises at least a first network terminal device, a second network terminal device and a third network terminal device, the directory service server A and the traversal server C and the first network terminal device and the second network terminal device can traverse through at least one NAT router and/or firewall to establish a connection channel between each other for data access through the traversal server C. In addition, when the first network terminal device attempts to establish a network connection to the second network terminal device to perform a network application, such as video conferencing or VoIP/V$^2$oIP call, the first network terminal device sends a VoIP call request to the directory service server A. The directory service server A then finds IP addresses and responsive connection ports and utilizes packet data formats for a source user and a destination user indicated by the VoIP call request according to the user identification code of the source user and the identification code of the destination user included in the VoIP call request and then transmits the found information to the traversal server C. For example, when the user "Jason" attempts to call the other user "John" to make a VoIP call, the directory service server A may find information regarding the IP address and connection port, packet data format and so on of the "Jason" and "John" by table lookup and then transmits those found information to the traversal server C.

First, when the traversal server C receives a VoIP call request of the first and second network terminal devices, in step S202, the traversal server C detects a network topology level of the first and second network terminal devices to detect whether the first and second network terminal devices are located within/behind the NAT router and/or firewall. Note that the traversal server C can be, for example, a STUN/TURN server or a HTTP tunneling server depending on the network architecture, but it is not limited thereto. In this step, the detection of the network topology level of a network terminal device can be performed by detecting relative network location of the network terminal device and the way that the network terminal device is being connected, such as detecting whether the network terminal device is directly connected to the Internet, located within a private network, the number of the NAT routers/firewalls it passed through prior to connecting to the Internet and so on, but the invention is not limited thereto. For example, if the first network terminal device is directly connected to the Internet, the responsive network topology level of the first network terminal device can be set to be 0; if the second network terminal device is connected to the Internet through a NAT router within a private network, the responsive network topology level of the second network terminal device can be set to be 1; and if the third network terminal device is connected to the Internet firstly through a NAT router within a private network and then through a firewall located on the private network, the responsive network topology level of the third network terminal device can be set to be 2. However, it is understood that the invention is not limited thereto. In practice, the traversal server C may send a number of test packets or signals to the first network terminal device and the second network terminal device respectively and then determine the responsive network topology level information for the first and second network terminal devices according to the reply messages obtained from the first and second network terminal devices.

After the traversal server C detects the network topology level of the first and second network terminal devices, in step S204, the traversal server C selects one of the first and second network terminal devices or the third network terminal device to substitute for the traversal server C according to the detection result for the first and second network terminal devices such that the selected network terminal device acted as a proxy server to substitute for the traversal server to establish a connection channel corresponding to the VoIP call request between the first and second network terminal devices so as to access data between each other via the established connection channel, such as performing video conferencing or VoIP/V2oIP call. In some embodiments, the functionality of the proxy server may comprise a functionality to substitute for a STUN/TURN server or a functionality to substitute for a HTTP tunneling server, but it is not limited thereto. The traversal server C may separately detect the responsive network topology levels of the two network terminal devices and then dynamically determine which one of them is to be assigned as the proxy server and the functionality of the server that it is substituted for according to the detection result. In some embodiments, the traversal server C may further comprise information related to the network topology levels of all network terminal devices within the network system and thus may then determine which one of them is to be assigned as the proxy server and the functionality of the server that it is substituted for according to these information. For example, if the network topology level of the first network terminal device is 0 and the network topology level of the second network terminal device is 1, the traversal server C will assign the first network terminal device to be the proxy server.

In one embodiment, when the first and second network terminal devices are located within a first private network (e.g. an enterprise network, a home network, a campus network and so on) and are connected to the Internet through a first firewall, the selected network terminal device is selected from one of the first and second network terminal devices. For example, referring to FIG. 1, it is assumed that network terminal devices 1 and 6 are located within a same firewall F1 of the private network 110. When a communication connection between the network terminal devices 1 and 6 is to be established, the network terminal device 1 first obtains information regarding the IP address, the connection port, the packet data format and other information of the network terminal device 6 from the directory service server A through the firewall F1. The directory service server A then informs the traversal server C. The traversal server C determines that the network terminal devices 1 and 6 are located within the same firewall F1 based on the responsive network locations (network topology levels) of the network terminal devices 1 and 6 and then assigns/selects one of the network terminal devices 1 and 6 to be its proxy server, assuming that the network terminal device 1 is being assigned in this embodiment. Thus, the traversal server C sends a message to the network terminal device 1 and upon reception of the message, the assigned network terminal device 1 enables its proxy server function for substituting for the traversal server. By doing so, the network terminal device 1 may substitute for the HTTP tunneling server to directly establish a connection channel with the network terminal device 6 using the HTTP tunneling and directly communicates with the network terminal device 6 through the established connection channel without through the traversal server C.

In one embodiment, when the first and second network terminal devices are located within a first private network and are connected to the Internet through a first firewall and the second network terminal device is further connected to the first firewall through a NAT router, the selected network terminal device is the second network terminal device. For example, referring to FIG. 1, it is assumed that network terminal devices 1 and 2 are located within a same firewall F1 of the private network 110 and the network terminal device 2 is further located within a NAT router N1. When a communication connection between the network terminal devices 1 and 2 is to be established, the network terminal device 1 first obtains information regarding the IP address, the connection port, the packet data format and other information of the network terminal device 2 from the directory service server A through the firewall F1. The directory service server A then informs the traversal server C. The traversal server C determines that the network terminal devices 1 and 2 are located within the same firewall F1 and the network terminal device 2 is further located within the NAT router N1 based on the responsive network locations of the network terminal devices 1 and 2 and then assigns/selects the network terminal device 1 to be its proxy server. Thus, the traversal server C sends a message to the network terminal device 1 and the assigned network terminal device 1 enables its proxy server function for substituting for the traversal server upon reception of the message. By doing so, the network terminal device 1 may substitute for the HTTP tunneling server to directly establish a connection channel with the network terminal device 2 using the HTTP tunneling and directly communicates with the network terminal device 2 through the established connection channel without through the traversal server C.

In one embodiment, when the first network terminal device is located within a first private network and is connected to the Internet through a first firewall, the second network terminal device is located within a second private network and is connected to the Internet through a second firewall and the third network terminal device is located on a public network and is directly connected to the Internet, the selected network terminal device is the third network terminal device. For example, referring to FIG. 1, it is assumed that network terminal devices 1 and 5 are located within a firewall F 1 of the private network 110 and a firewall F2 of the private network 120, respectively. When a communication connection between the network terminal devices 1 and 5 is to be established, the network terminal device 1 first obtains information regarding the IP address, the connection port, the packet data format and other information of the network terminal device 5 from the directory service server A through the firewall F1. The directory service server A then informs the traversal server C. The traversal server C determines that the network terminal devices 1 and 5 are located within two different firewalls F1 based on the responsive network locations of the network terminal devices 1 and 5 and thus determines to assign another network terminal device other than the network terminal devices 1 and 5 to be its proxy server. As shown in FIG. 1, the network terminal device 3 is a network terminal device that is located out of the two firewalls. Thus, the traversal server C may assign the network terminal device 3 to be its proxy server and sends a message to the network terminal device 3. Upon reception of the message, the assigned network terminal device 3 enables its proxy server function for substituting for the traversal server. By doing so, the network terminal device 3 may substitute for the HTTP tunneling server such that the network terminal devices 1 and 5 may establish a connection channel therebetween and communicate with each other through the network terminal device 3 located at the near end without through the traversal server C.

In one embodiment, when the first network terminal device is located within a first private network and is connected to the Internet through a first firewall and the second network terminal device is located on a public network and is connected to the Internet directly, the selected network terminal device is the second network terminal device. For example, referring to FIG. 1, it is assumed that the network terminal devices 1 is located within a firewall F1 of the private network 110 while the network terminal devices 8 is located out of the firewall F1. When a communication connection between the network terminal devices 1 and 8 is to be established, the network terminal device 1 first obtains information regarding the IP address, the connection port, the packet data format and other information of the network terminal device 8 from the directory service server A through the firewall F1. The directory service server A then informs the traversal server C. The traversal server C determines that the network terminal devices 1 and 8 are located within and out of the firewall respectively based on the responsive network locations of the network terminal devices 1 and 8 and thus determines to assign the network terminal device 8 to be its proxy server. Thus, the traversal server C sends a message to the network terminal device 8. Upon reception of the message, the assigned network terminal device 8 enables its proxy server function for substituting for the traversal server. By doing so, the network terminal device 3 may substitute for the HTTP tunneling server to directly establish a connection channel with the network terminal device 1 using the HTTP tunneling and directly communicates with the network terminal device 1 through the established connection channel without through the traversal server C.

In one embodiment, when two network terminal devices are located within different firewalls and are located within different NAT routers, the traversal server C may determine to assign another network terminal device that is located out of the two firewalls to be it proxy server. For example, referring to FIG. 1, it is assumed that the network terminal devices 2 is located within a NAT router N1 of the private network 110 under a firewall F1 while the network terminal devices 11 is located within another NAT router N2 of the private network 120 under another firewall F2. When a communication connection between the network terminal devices 2 and 11 is to be established, the network terminal device 2 first obtains information regarding the IP address, the connection port, the packet data format and other information of the network terminal device 11 from the directory service server A through the firewall F1. The directory service server A then informs the traversal server C. The traversal server C determines that the network terminal devices 2 and 11 are located within different firewalls and also located under different NAT routers based on the responsive network locations of the network terminal devices 2 and 11 and thus determines to assign a network terminal device 8 that is out of the two firewalls to be its proxy server. Thus, the traversal server C sends a message to the network terminal device 8. Upon reception of the message, the assigned network terminal device 8 enables its proxy server function for substituting for the traversal server. By doing so, the network terminal device 8 may substitute for the HTTP tunneling server such that the network terminal devices 2 and 11 may establish a connection channel therebetween and communicate with each other through the network terminal device 8 without through the traversal server C.

In other words, the network terminal device 2 may connect to the Internet through the network terminal device 8 and thus the network terminal device 2 may traverse through the first NAT router N1 and the firewall F1 through the proxy server function to substitute for the functionality of the HTTP tunneling server of the network terminal device 8 to pass through the Internet to further traverse through the firewall F2 to connect to the second NAT router N2 under the second private network 120 so as to obtain an assigned IP address therefrom and send the assigned IP address to the network terminal device 11 within the second private network 120 through the second NAT router N2. Similarly, the network terminal device 11 may traverse through the same way as aforementioned to obtain an assigned IP address and send the assigned IP address to the network terminal device 2 such that the network terminal devices 2 and 11 can traverse firewalls configured on the responsive first NAT router and second NAT router respectively to establish a seamless connection channel between each other and access data between each other.

Similarly, referring to FIG. 1, it is assumed that network terminal devices 4 and 9 are located within a same NAT router N3 of a same private network 130. When a communication connection between the network terminal devices 4 and 9 is to be established, the traversal server C may determine that the network terminal devices 4 and 9 are located within the same NAT router N3 based on the responsive network locations of the network terminal devices 4 and 9 and then assigns/selects the network terminal device 4 or 9 to be its proxy server. Thereafter, the assigned network terminal device may enable its proxy server function for substituting for the STUN/TURN server to directly establish a connection channel with the other network terminal device and communicate with the other network terminal device through the established connection channel without through the traversal server C.

In the embodiments, each of the network terminal devices 1-11 may both have original terminal device function to act as a terminal device and a proxy server function to substitute for a specific server, wherein the original terminal device function is enabled while the proxy server function is disabled at initial. Note that the traversal server C may assign one of the network terminal devices to be the proxy server by enabling the proxy server function of that network terminal device and assigning a functional type of the server to be substituted for. After the proxy server function of any network terminal device has been enabled, the network terminal device will have both the terminal device functionality and the proxy server function to substitute for the functionalities of the assigned type of the server. For example, if the traversal server C assigns the first network terminal device to be the proxy server of the STUN server, the proxy server function of the first network terminal device will be enabled to be used as a normal STUN server. It is to be understood that although the first network terminal device should act as a proxy server to substitute for the functionalities of the STUN, it only requires handling connection channel establishment of two network terminal devices, thus increasing only few overhead of the first network terminal device and making easy in implementation.

In some embodiments, after the connection is terminated, the traversal server C may further disable the proxy server function of the first network terminal device to avoid unnecessary power consumption of the first network terminal device upon reception of a request for terminating connection from any network terminal device.

In summary, with the connection establishing management methods for traversing network address translation (NAT) routers and firewalls between network terminal devices to establish a connection channel and related network systems of the invention, when the network terminal devices are blocked by the NAT routers and Firewalls and require the remote traversal server on the Internet to pass through the NAT router and Firewall to establish a connection channel, the remote traversal server can intelligently determine which network terminal device to substitute for the functionality of the remote traversal server based on the network topology levels of all of the network terminal devices, thus significantly reducing the load of the remote server. In addition, through the network terminal device framework with the proxy server function provided by the invention, the proximal network terminal device can be assigned to substitute for the functionality of the remote traversal server, thus effectively reducing the chance of transmission delay and packet loss and further providing a higher quality of video images.

Connection establishing management methods for use in a network system, or certain aspects or portions thereof, may take the form of a program code (i.e., executable instructions) embodied in tangible media, such as floppy diskettes, CD-ROMS, hard drives, or any other non-transitory machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. To the contrary, it is intended to cover various modifications and similar arrangements (as would be apparent to the skilled in the art). Therefore, the scope of the appended claims should be accorded to the broadest interpretation so as to encompass all such modifications and similar arrangements.

What is claimed is:

1. A connection establishing management methods for traversing network address translation (NAT) routers and firewalls between network terminal devices to establish a connection channel therebetween for use in a network system, wherein the network system includes at least first, second and third network terminal devices and a traversal server and the first and second network terminal devices can traverse at least one NAT router and/or firewall to establish a connection channel between each other for data access through the traversal server, the method comprising:

detecting a network topology level of the first and second network terminal devices to detect whether the first and second network terminal devices are located behind the NAT router and/or firewall when the traversal server receiving a call request of the first and second network terminal devices; and selecting one of the first and second network terminal devices or the third network terminal device according to the detection result for the first and second network terminal devices such that the selected network terminal device acted as a proxy server to substitute for the traversal server to establish a connection channel corresponding to the call request between the first and second network terminal devices so as to access data via the established connection channel.

2. The connection establishing management method of claim 1, wherein the functionality of the proxy server comprises a functionality to substitute for a STUN/TURN server.

3. The connection establishing management method of claim 1, wherein the functionality of the proxy server comprises a functionality to substitute for a HTTP tunneling server.

4. The connection establishing management method of claim 1, wherein when the first and second network terminal devices are located within a first private network and are connected to the Internet through a first firewall, and the selected network terminal device is selected from one of the first and second network terminal devices.

5. The connection establishing management method of claim 1, wherein when the first and second network terminal devices are located within a first private network and are connected to the Internet through a first firewall and the second network terminal device is further connected to the first firewall through a NAT router, the selected network terminal device is the second network terminal device.

6. The connection establishing management method of claim 1, wherein when the first network terminal device is located within a first private network and is connected to the Internet through a first firewall, the second network terminal device is located within a second private network and is connected to the Internet through a second firewall and the third network terminal device is located on a public network, the selected network terminal device is the third network terminal device.

7. The connection establishing management method of claim 1, wherein when the first network terminal device is located within a first private network and is connected to the Internet through a first firewall and the second network terminal device is located on a public network and is connected to the Internet directly, the selected network terminal device is the second network terminal device.

8. The connection establishing management method of claim 1, wherein the selected network terminal device further includes a disabled proxy server function and the proxy server function of the selected network terminal device is enabled to substitute for the traversal server.

9. A network system, comprising:
at least first, second and third network terminal devices; and
a traversal server, wherein the first and second network terminal devices can traverse at least one NAT router and/or firewall to establish a connection channel between each other for data access through the traversal server,
wherein the traversal server detects a network topology level of the first and second network terminal devices to detect whether the first and second network terminal devices are located behind the NAT router and/or firewall upon reception of a call request of the first and second network terminal devices, and selects one of the first and second network terminal devices or the third network terminal device according to the detection result for the first and second network terminal devices such that the selected network terminal device acted as a proxy server to substitute for the traversal server to establish a connection channel corresponding to the call request between the first and second network terminal devices so as to access data via the established connection channel.

* * * * *